United States Patent
Munk et al.

(10) Patent No.: US 7,370,402 B2
(45) Date of Patent: May 13, 2008

(54) METHOD FOR PRODUCING STATOR PACKS FOR LONG-STATOR LINEAR MOTORS OF MAGNETIC LEVITATION RAILWAYS

(75) Inventors: Kurt Munk, Grenzach (DE); Michael Tum, Kassel (DE)

(73) Assignee: ThyssenKrupp Transrapid GmbH, Kassel (DE)

(*) Notice: Subject to any disclaimer, the term of this patent is extended or adjusted under 35 U.S.C. 154(b) by 17 days.

(21) Appl. No.: 11/569,114

(22) PCT Filed: Jun. 9, 2005

(86) PCT No.: PCT/DE2005/001032

§ 371 (c)(1),
(2), (4) Date: Nov. 14, 2006

(87) PCT Pub. No.: WO2005/122365

PCT Pub. Date: Dec. 22, 2005

(65) Prior Publication Data

US 2007/0186406 A1 Aug. 16, 2007

(30) Foreign Application Priority Data

Jun. 14, 2004 (DE) ................. 10 2004 028 947

(51) Int. Cl.
*H02K 15/00* (2006.01)
*H02K 15/14* (2006.01)
*H02K 15/16* (2006.01)

(52) U.S. Cl. .................. 29/596; 29/592.1; 29/602.1; 29/841; 29/884; 264/272.11; 310/12; 310/180; 310/184; 310/216; 310/254

(58) Field of Classification Search .............. 29/592.1, 29/594, 596, 602.1, 841, 855–858, 883, 884; 264/272.11; 310/12, 180, 184, 216, 254, 310/263

See application file for complete search history.

(56) References Cited

U.S. PATENT DOCUMENTS

| 4,665,329 A | 5/1987 | Raschbichler |
| 4,728,382 A | 3/1988 | Raschbichler |
| 5,176,946 A * | 1/1993 | Wieloch ............. 428/138 |

(Continued)

FOREIGN PATENT DOCUMENTS

DE 31 10 339 9/1982

(Continued)

*Primary Examiner*—Paul D. Kim
(74) *Attorney, Agent, or Firm*—Michael J. Striker

(57) ABSTRACT

A method for producing stator packs for long-stator linear motors of magnetic levitation vehicles is described. At first steel sheets are stacked to form a sheet stack, cross members are inserted into grooves of the sheet stack and the sheet stack and the cross members are connected with each other to form a solid structural unit. Further it is provided to so insert the structural unit into an open-top casting mold that the cross members are laid onto rims of the casting mold by means of head parts provided at their ends and are positioned by means of positioning pins provided at said ends. Afterwards the filling of the casting mold with a casting resin mixture takes place, advantageously pressureless, for the formation of a corrosion protection layer surrounding the sheet stack. After the hardening of the casting resin mixture the finished stator pack can be removed from the casting mold.

11 Claims, 4 Drawing Sheets

U.S. PATENT DOCUMENTS

| | | |
|---|---|---|
| 5,606,205 A | 2/1997 | Defontaine et al. |
| 6,584,671 B2 * | 7/2003 | Miller et al. .................. 29/596 |
| 6,629,358 B2 | 10/2003 | Setiabudi et al. |
| 2001/0002507 A1 | 6/2001 | Miller et al. |

FOREIGN PATENT DOCUMENTS

| | | |
|---|---|---|
| DE | 39 28 277 | 12/1990 |
| DE | 197 03 497 | 8/1998 |

* cited by examiner

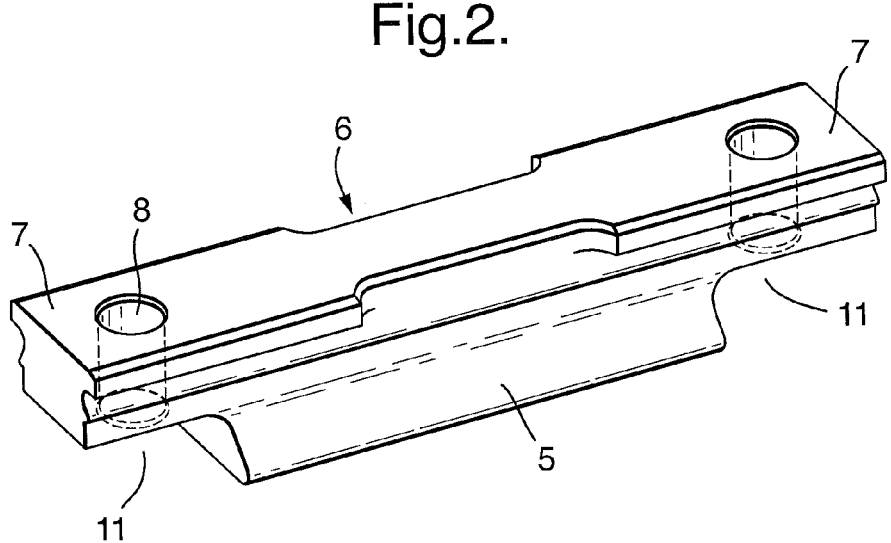
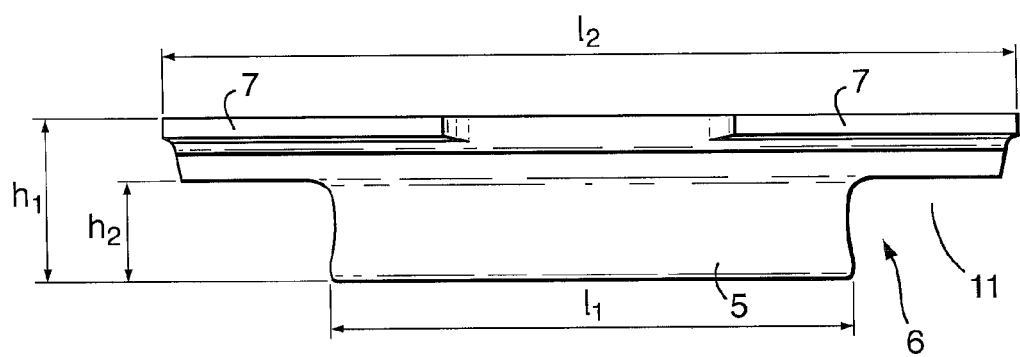

METHOD FOR PRODUCING STATOR PACKS FOR LONG-STATOR LINEAR MOTORS OF MAGNETIC LEVITATION RAILWAYS

The invention relates to a method for producing stator packs for long-stator linear motors of magnetic levitation railways and to a stator pack produced according to this method.

In a prior art method of this kind (DE 31 10 339 C2), metal sheet blanks or lamellae provided with layers of adhesive and obtained by punching are stacked to form a staple and then connected by heating while being simultaneously pressed to form a stack of metal sheets. Subsequently the metal sheet stack is additionally provided with a coating consisting of epoxy resin which especially serves as corrosion protection layer for the cut edges of the sheets being exposed by punching. Finally, the metal sheet stack is connected by bolts, adhesive, or in any other form with cross members to form a finished stator pack, the cross members being inserted into its grooves and needed for fastening the stator packs to the guideway of a magnetic levitation railway. Due to numerous process steps involved, a production of stator packs of this kind is intricate in production process execution, not perfect with regard to the corrosion protection layer and not sufficiently suitable for production in series at a high productivity rate.

Therefore, it is already known (DE 197 03 497 AI) to coat the stator packs with a corrosion protection layer by using closed tools and a pressure gelation process. Accordingly, the entire stator pack including the cross members is arranged in a cavity of a closed casting mould in which a negative pressure of some millibars is maintained during injection of a hardenable casting resin mixture, while the casting resin mixture is supplied at a pressure of over 1 bar to 3 bar, for example. This method satisfies high technical requirements and turned out to be useful in series production. But on account of the complexity of the production process, it fails to give sufficient process safety, i.e. production is subject to fluctuations in quality. Moreover, productivity is limited, for example because the pressure of the casting resin mixture should be maintained for quite some time even during the solidifying phase to avoid shrinkage. Furthermore, to achieve a homogenous flow of the casting resin mixture in the cavity, it is required to apply several sprues which involves the necessity of sophisticated and complicated casting moulds and casting installations due to the closed tool. Finally, in order to ensure precise positioning in the cavity, the metal sheet stacks are positioned at a certain distance to the walls confining the cavity by means of porous fabric mats or the like, which leads to obstructions of the casting resin flow and decelerates the casting process on the whole.

Starting from the above, the technical problem underlying the present invention lies in improving the above mentioned method so as to make it possible to increase productivity at comparably low capital investment cost and to obtain stator packs in series production that are largely free from blowholes (blisters) and inclusions.

The features of claim 1 serve to solve this technical problem. Furthermore, the method according to this invention leads to stator packs having the characterizing features of claim 11.

The invention yields the advantage that it is possible to work without pressure and, therefore, with open and simple, particularly two-part casting moulds. Owing to the connection of the metal sheet stack and the cross members to form a one-part construction unit prior to the casting process, the positioning of the metal sheet stack in the cavity can be executed by the aid of the cross members, thus eliminating the need for spacer elements made of fabric material and for other positioning elements, and therefore allowing for short filling times. Consequently, the duration of occupying the casting moulds can be reduced, while productivity is increased at the same time. Nevertheless, even during a quick filling of the casting moulds, stator packs are obtained that are free from blowholes (blisters) and inclusions (bubbles) and have faultless quality.

Other advantageous features of the present invention become evident from the subclaims.

The invention is explained in greater detail as set forth below by means of an embodiment, based on the drawings enclosed hereto and being drawn in different scales, wherein:

FIG. 2 shows a perspective view of a new cross member especially designed for the method of the present invention;

FIG. 3 shows a side view of the cross member according to FIG. 2;

Figure 1:
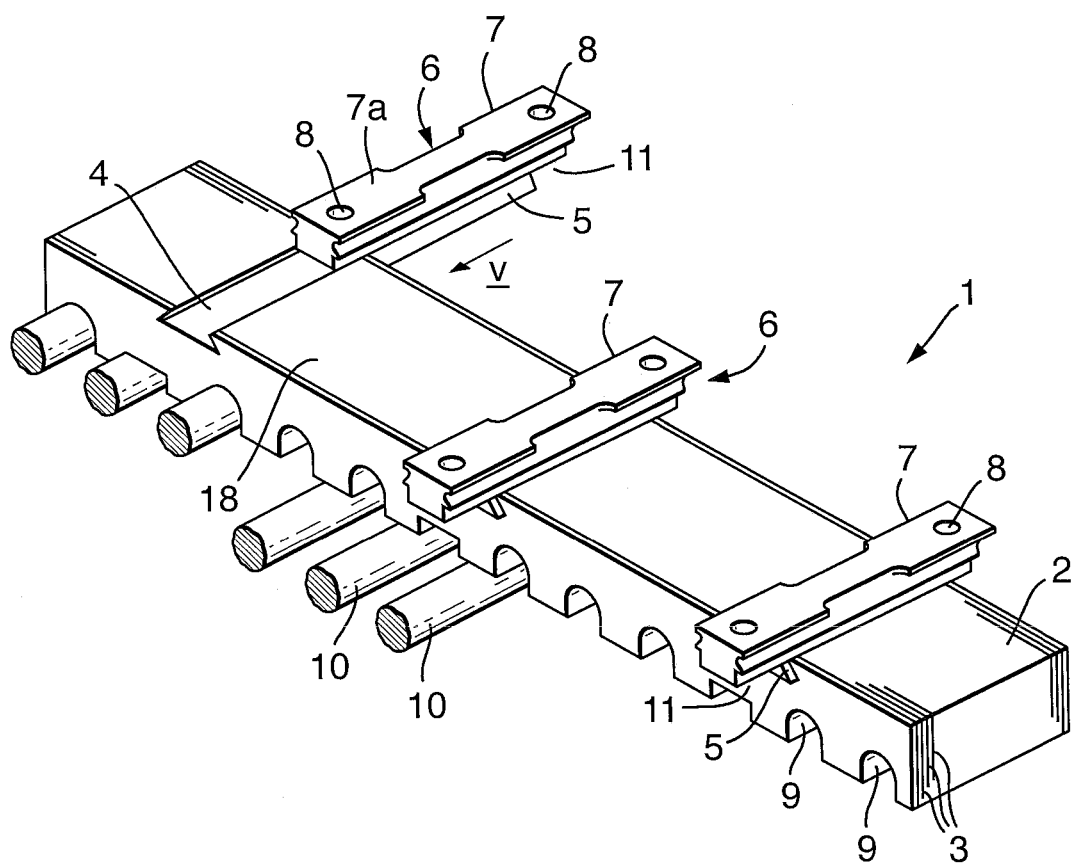
FIG. 1 shows a perspective, partly broken-up view of a stator pack.

According to FIG. 1, a stator pack 1 for long-stator linear motors of magnetic levitation vehicles comprises a plurality of ferromagnetic metal sheets or lamellae 3 lying flush against each other and forming a metal sheet stack 2. In an upper area, the sheets 3 formed from punching blanks have at least one, here three outbreaks which open to the rims and form three transversely extending continuous grooves 4 in the finished metal sheet stack 2. The grooves 4 preferably have a dovetail-shaped cross-section and serve to accommodate appropriately shaped foot sections 5 which are formed at the undersides of straight cross members 6 that have cross-sections which are mainly configured according to the kind of double T-beams. Therefore, as shown in FIG. 2, the cross members 6 with their foot sections 5 can be inserted into the grooves 4 in the direction of an arrow v until they protrude with head parts 7 beyond the metal sheet stack at both sides of the metal sheet stack 2.

The head parts 7 are provided with a passage 8 each arranged transversely to the longitudinal direction of cross members 6. After the cross members 6 have been correctly inserted into the grooves 4, both passages 8 are freely accessible from both ends and suitable for accommodation of fixing screws that serve for mounting the cross members 6 to the guideway of a magnetic levitation railway. Surfaces 7a of head parts 7 are therefore arranged slightly above the surfaces of the metal sheet stacks 2. Due to the dovetail-shaped foot sections 5 and the corresponding groove cross-sections in a direction parallel to the screw axes, the metal sheet stacks 2 when installed are mainly retained in a form-locking manner to the cross members 6 and/or the guideway.

At their undersides, the metal sheets 3 are provided with further outbreaks open to the rims and which form, in the finished metal sheet stack 2, grooves 9 (FIG. 2) which are arranged in parallel to the grooves 4 and into which alternate current windings 10 are inserted that are only indicated schematically.

The stator packs 1 of the kind described hereunder are generally known, e.g. through printed publications DE 31 10 339 C2, DE 39 28 277 C1, and DE 197 03 497 AI which for the sake of avoiding repetitions are made a part of the present disclosure by reference.

According to the present invention, the head parts 7 of the cross members 6 are provided with recesses 11 worked-in from beneath, which have mainly cuboid-shaped cross-sections and which are of a continuous configuration over the widths of cross members 6, as is particularly shown on FIG. 2 and FIG. 3. Thereby, the cross members 6, contemplated in the side view according to FIG. 3, receive a mainly T-shaped profile so that they have a height h1 in their middle areas containing the foot sections 5 and a length $l_1$ in the lower areas containing the two recesses 11, while the length of cross members 6 in the upper areas containing the head parts 7 have a measure of $l_2 > l_1$. Finally, the height of the recesses 11 and the distances of the bottom edges of foot sections 5 from the bottom edges of head parts 7, has a measure of h2<h1. Accordingly, the measures $l_1$ and $l_2$ (FIG. 3) have been so chosen that the foot sections 5, when the cross members 6 have been inserted, mainly extend over the entire width of the metal sheet stack 2, while the head parts 7 with the passages 8 are arranged outside the metal sheet stack 2, as is particularly shown on FIG. 1.

The shape of the cross members 6 according to the present invention especially serves for a simplified covering of the metal sheet stack 2 with a corrosion protection layer. For this purpose, the cross members 6 are initially coated in a first, preparatory step of work with a corrosion-proof varnish by deburring them, if necessary, and by then subjecting them to a cathodic dipping (dip coating) process, for example. Subsequently, the cross members 6 are inserted into the grooves 4 of the piled-up metal sheet stack 2 and then heated together with it in order to soften the layers of adhesive or the like applied onto the bottoms of grooves 4 and/or the undersides of foot sections 5 as well as onto the broad sides of the sheets 3 and to thereby connect the sheets 3 with each other on the one side and to thereby connect the metal sheet stack 2 with the cross members 6 to a one-part pre-fabricated construction module on the other hand.

The pre-fabricated construction unit is now treated in a casting tool in order to provide the metal sheet stack 2 with a corrosion-protection layer. To this effect the tool (FIG. 3) contains a two-part casting mould 12 with two mould halves 12a and 12b that are movable against each other and disengageable in the direction of a double arrow and which abut each other in a closed condition of the tool along a junction plane 14. The casting mould 12 encloses a cavity 15 that is open at a top even if being in the closed condition, and the walls of the cavity 15 extend along a contour that mainly corresponds to the outer contour of the metal sheet stack 2 and is arranged in parallel to same. A height h3 of the cavity 15 is so rated that it can accommodate the metal sheet stack 2 in its full height and additionally the foot section 5 as well as short bordering sections 16 of cross members 6 that are arranged between the bottom edges 17 of head parts 7 and an upper side 18 of said metal sheet stack 2 and that protrude upwardly from the grooves 4 (FIG. 1). Moreover, the cavity 15 has a cross-section which is a little bit greater than the cross-section of the metal sheet stack 2, but is a little bit smaller in the longitudinal direction of the cross members 6 than corresponds to the lengths 12 of the cross members 6.

Mounted at the upper rims of the mould halves 12a, 12b which surround the cavity 15 and/or at its walls are two positioning pins each, the distances of which match exactly the distances of the two passages 8 in the cross members 6. If three cross members per metal sheet stack 2 are provided, also three pairs of such positioning pins 19 are provided.

Figure 4:
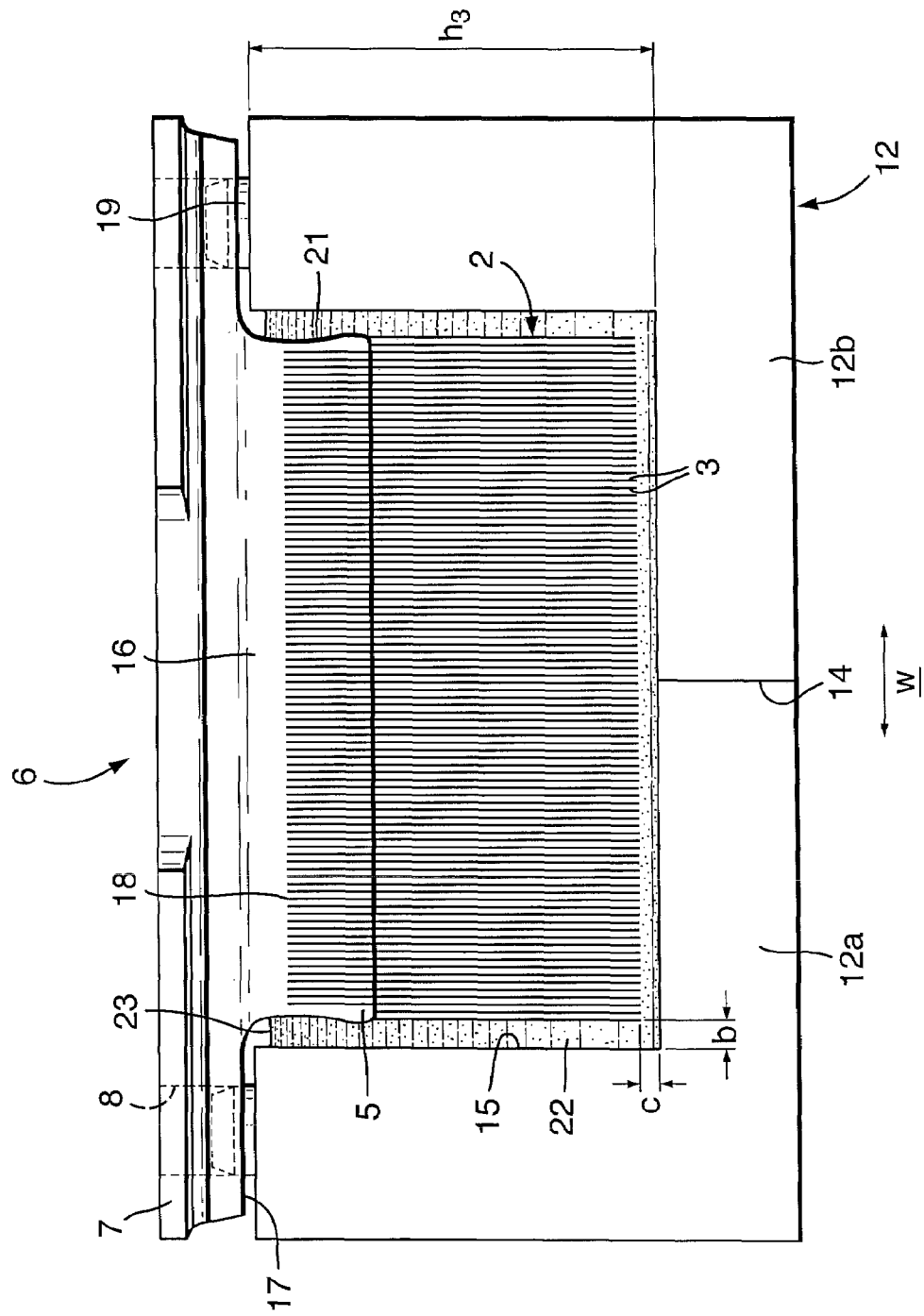
FIG. 4 shows a schematic longitudinal section through a casting tool suitable for the method of the present invention.

The pre-fabricated structural unit comprised of the metal sheet stack 2 and the cross members 6 is so introduced into the cavity 15, with the metal sheet stack 2 being in front, that the cross members 6 are laid with their head parts onto the upper rims of the casting mould 12, and that the positioning pins 19 enter into assigned passages 8 of the head parts 7, as is clearly shown on FIG. 4. Thereby, the position of the structural unit comprised of the metal sheet stack 2 and cross members 6 is clearly defined in relation to the casting mould 12. This arrangement has moreover been chosen so that the side walls and the bottom of the metal sheet stack 2 have defined distances from associated wall and bottom parts of the casting mould 12 bordering the cavity 15, and therefore intermediate spaces with a preselected width b (FIG. 4) remain between the said wall parts on the one hand and intermediate spaces with a preselected measure c (FIG. 4) remain between the said bottom parts on the other hand, for example by choosing the size of h2 (FIG. 3) by the measure c smaller than the size of h3 (FIG. 4). Furthermore, after inserting the structural unit, a gap 20 (FIG. 5) extending all around will remain above the metal sheet stack 2 which can even be enhanced in the area of the cross members 6 by a special shaping of curved, lower transitional areas 21 between the foot sections 5 and the bottom edges 17 of the head parts 7.

Having inserted the described structural unit according to FIG. 4 into the tool, the cavity 15 is filled with a corrosion-resistant casting resin mixture 22 which preferably contains a hardenable, particularly thermally hardenable mixture (Duroplast) made of a plastic material (e.g. epoxy resin) and a hardener (e.g. carboxylic acid). The casting resin mixture 22 is introduced in a liquid condition from the upper rim of the opening or the gap 20 of cavity 15 until its liquid level 23 stands closely under an upper rim of the wall sections surrounding the cavity 15 (FIG. 4) and/or at least stands with a certain amount above the upper edge of the metal sheet stack 2 which amount corresponds to the thickness of the corrosion protection layer to be applied.

Then the casting resin mixture 22 is left to hardening, possibly with supply of heat. Thereby the metal sheet stack 2 and lower rim sections of the cross members 6 are provided with a thin casting resin and/or corrosion protection layer corresponding to the values b and c in FIG. 4 and firmly connected to each other. As soon as the layer has been hardened sufficiently, the mould halves 12a, 12b can be separated from each other in the direction of a double arrow drawn-in in FIG. 4, whereupon the finished stator pack 1 can be taken out.

Figure 5:
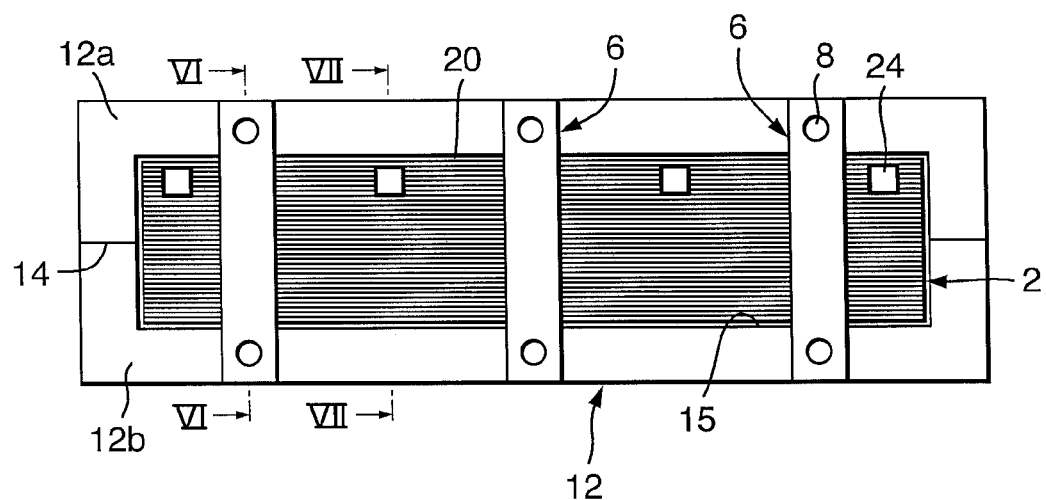
FIG. 5 shows a top view on the casting tool according to FIG. 4.

An especially homogenous configuration of the corrosion protection layer is achieved, if the casting resin mixture 22 according to FIG. 5 is supplied with the aid of a supply pipe that has a plurality of casting nozzles 24 placed at a certain distance in the longitudinal direction of the metal sheet stack 2. It is of special advantage to provide a casting channel extending continuously over the length of the cavity 15 instead of several casting nozzles 24.

Figure 6:
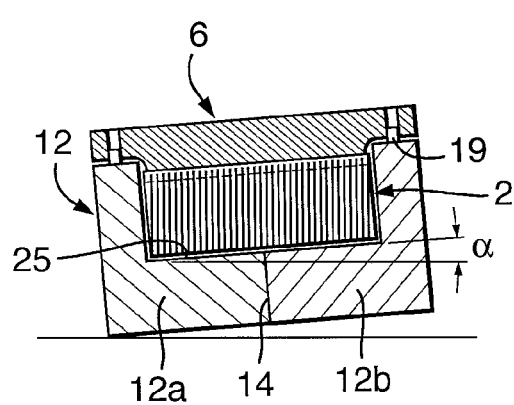
FIG. 6 and FIG. 7 show sections along the lines VI-VI and VII-VII of FIG. 5.
Figure 7:
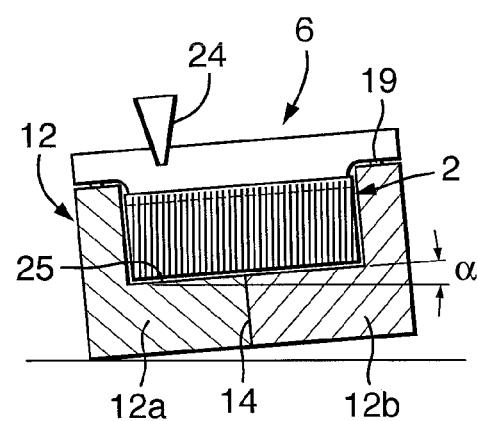

In accordance with an especially preferred embodiment currently considered the best, the casting mould 12 is brought into a slightly oblique position during filling-in of the casting resin mixture 22 as is schematically shown in FIG. 6 and FIG. 7. The angle of inclination α between a bottom 25 of cavity 15 and the horizontal may range for example between 5° and 25°, preferably between approximately 12° and 20°. The deepest point of the cavity 15 according to FIG. 7 expediently lies at that longitudinal side where the cavity 15 is filled, i.e. where the gap 20 and/or the casting nozzles 24 or the casting channel are located. It is achieved thereby that the liquid casting resin mixture rises slowly from the deepest point of the cavity 15 gradually in an upward direction, thus displacing air from the cavity 15 and possible hollow spaces formed by undercuts, and therefore making it possible to obtain a set-up of the corrosion protection layer free from blowholes and bubbles. This process is essentially supported by positioning the metal sheet stack 2 in the cavity 15 on the one hand through its firm connection with the cross members 6 and on the other hand by means of the positioning pins 19 (FIG. 4 and FIG. 6) which is the reason for not having to provide any spacer fabric or the like between the metal sheet stack 2 and the walls of the cavity 15. The casting resin mixture 22 can therefore spread unrestrictedly in the cavity 15, which is promoted not least also by a concave, inwardly directed arch of the transitional sections 21 (FIG. 4) in the area of the cross members 6.

During the filling with the casting resin mixture 22 or even immediately afterwards, the casting mould 12 can gradually be raised to a horizontal position, with the resetting speed being expediently chosen so slow that the casting resin mixture 22 does not flow over the upper edges of the walls bordering the cavity 15. Thereby, a trouble-free spreading and hardening of the casting resin mixture 22 on the whole is achieved, and it is possible to compensate for shrinkage, if any, from a surplus of the casting resin mixture 22 precautionarily deposited above the metal sheet stack 2. Moreover, the quick, pressure-less effected filling of the cavity 15 leads to an increase in productivity and thus to a reduction of that part of the production costs which is allocated to the production of the corrosion protection layer being for example 2 mm to 4 mm thick. Furthermore, an exact control of the filling volumes can be provided for, because in contrast with the well-known pressure gelation process, there will be no losses of material due to necessary sprue and venting ducts.

The invention is not limited to the described embodiment that can be diversified in a plurality of ways. In particular this applies to the shapes of the metal sheet blanks for the metal sheet stack 2 used in an individual case as well as to the shape of the grooves 4 and foot sections 5. Furthermore it would be possible to arrange the entire casting tool during the casting procedure in a vacuum chamber. Moreover, the method according to the invention allows for adding substantially larger quantities of particularly mineralic filling substances to the casting resin, because the cavity of the tool can be filled evenly over greater cross-sections such that a possibly deteriorated flowing behaviour of the casting-resin mixture will take less unfavourable effects. Besides, it is self-explanatory that the different features can also be applied in combinations other than those described and shown hereinabove.

The invention claimed is:

1. A method for producing stator packs (1) for long-stator linear motors of magnetic levitation railways, comprising of the following method steps:

Stacking a plurality of punched ferromagnetic sheets (3) coated with an adhesive to form a stack (2) that is provided with continuous grooves (4) in one surface;
   Inserting a cross member (6) each into each groove (4), each cross member (6) having at both ends a head part (7) protruding beyond said metal sheet stack (2) projecting from said groove (4) and provided with a recess (11) towards its underside, with at least one passage (8) each being configured in each head part;
   Connecting the metal sheet stack (2) and the cross members (6) to a firm structural unit;
   Inserting the structural unit into an open-top cavity (159) of a casting mould (12) in such a manner that the metal sheet stack (2) comes to rest in the cavity (15) and that the cross member (6) with its head parts (7) lays itself onto rims of wall sections bordering the cavity (15), wherein positioning pins (19) provided at the wall sections at least partly enter into the passages (8) of the head parts (7) and wherein the arrangement is so chosen that spaces remain between the walls bordering the cavity (15) and the bottoms of the casting mould (12) on the one hand and the metal sheet stack (2) and an adjacent part of the cross members (6) being arranged in the grooves (4) on the other hand;
   Filling the cavity (15) with a casting resin mixture (22) to cover the metal sheet stack (2) and the adjacent parts of the cross members (6) with a corrosion protection layer;
   Opening the casting mould (12) after an at least partly hardening of the casting resin mixture (22), and
   Removing the stator pack (1) from the casting mould (12).

2. The method according to claim 1, characterized in that the filling of the cavity (15) is effected at a longitudinal side of the casting mould (12) alongside a casting channel or by way of several casting nozzles (24).

3. The method according to claim 1, characterized in that the casting mould (12) is brought into an oblique position when being filled with the casting resin mixture (22).

4. The method according to claim 3, characterized in that the oblique positioning is taken relatively to that longitudinal side at which the casting channel or the casting nozzles (24) are located.

5. The method according to claim 3, characterized in that the oblique positioning is so taken that the area of the cavity (15) where the casting channel and/or casting nozzles (24) are located lies at the deepest point.

6. The method according to claim 3, characterized in that the oblique position is taken at an angle of 5° to 25°, preferably at an angle of 12° to 20°.

7. The method according to claim 3, characterized in that the casting mould (12) is gradually raised again to the horizontal after the process of filling-in the casting resin mixture has begun.

8. The method according to claim 1, characterized in that the passages (8) in the head parts (7) of the cross members (6) are simultaneously arranged as screwholes for fixing screws.

9. The method according to claim 1, characterized in that the cross members (6) are subjected to a cathodic dipping process before they are inserted into the grooves (4) of the metal sheet stack (2).

10. The method according to claim 1, characterized in that the filling of the cavity with the casting resin mixture (22) is effected in a pressureless mode.

11. A stator pack for the long-stator linear motor of a magnetic levitation railway, characterized in that it is produced in conformity with claim 1.

* * * * *